US008700001B2

(12) United States Patent
Hosono

(10) Patent No.: US 8,700,001 B2
(45) Date of Patent: Apr. 15, 2014

(54) RADIO COMMUNICATION METHOD AND NETWORK DEVICE FOR DETECTING UNAUTHORIZED MOVEMENT OF A HOME RADIO BASE STATION

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 504 days.

(21) Appl. No.: 12/996,228

(22) PCT Filed: Jun. 4, 2009

(86) PCT No.: PCT/JP2009/060274
§ 371 (c)(1),
(2), (4) Date: Feb. 17, 2011

(87) PCT Pub. No.: WO2009/148129
PCT Pub. Date: Dec. 10, 2009

(65) Prior Publication Data
US 2011/0143680 A1    Jun. 16, 2011

(30) Foreign Application Priority Data

Jun. 4, 2008   (JP) ................................. 2008-147471

(51) Int. Cl.
*H04W 64/00* (2009.01)
*H04W 88/08* (2009.01)
(52) U.S. Cl.
USPC .......................... 455/411; 455/561; 455/456.1
(58) Field of Classification Search
None
See application file for complete search history.

(56) References Cited

U.S. PATENT DOCUMENTS

| 7,075,912 B2 | 7/2006 | Suda et al. |
| 2006/0209799 A1 * | 9/2006 | Gallagher et al. ............. 370/352 |
| 2007/0206537 A1 * | 9/2007 | Cam-Winget et al. ......... 370/331 |
| 2008/0070565 A1 | 3/2008 | Maeda |
| 2008/0205699 A1 * | 8/2008 | Kuraki et al. ................. 382/100 |

FOREIGN PATENT DOCUMENTS

| JP | 10 191442 | 7/1998 |
| JP | 2003 249944 | 9/2003 |
| JP | 2006-140563 | 6/2006 |
| JP | 2007 228383 | 9/2007 |
| WO | WO 2006/054341 A1 | 5/2006 |

OTHER PUBLICATIONS

Office Action issued Apr. 24, 2012, in Japanese Patent Application No. 2010-515919 (with English-language translation).

(Continued)

*Primary Examiner* — Philip Sobutka
(74) *Attorney, Agent, or Firm* — Oblon, Spivak, McClelland, Maier & Neustadt, L.L.P.

(57) ABSTRACT

A mobile communication method according to the present invention includes step of managing identification information on a radio base station 201 and identification information on an information transfer device 502 in association with each other in a radio base station manager 13 by a network device 100, step of transmitting, when the radio base station 201 is moved, an installation signal from the radio base station 201 to an information transfer device 502 to which the radio base station is connected, step of transferring the received installation signal from the information transfer device 502 to which the radio base station is connected to the network device 100, and step of detecting by the network device 100 an unauthorized moving of the radio base station 201, in a case where the network device determines by referring to the radio base station information manager that the identification information on the radio base station included in the received installation signal and the identification information on the information transfer device to which the radio base station is connected are not managed in association with each other.

4 Claims, 3 Drawing Sheets

(56) References Cited

OTHER PUBLICATIONS

"Requirements for LTE Home eNodeBs, 3GPP TSG RAN #35", RP-070209, Orange, Telecom Italia, T-Mobile, Vodafone, Agenda Item 10-19, Discussion & Decision, Total pp. 4, (Mar. 6-9, 2007).

International Search Report issued Aug. 18, 2009 in PCT/JP09/060274 filed Jun. 4, 2009.

Office Action issued Jan. 22, 2013 in Chinese Patent Application No. 200980121210.3 with English language translation.

* cited by examiner

| INFORMATION TRANSFER DEVICE ID | RADIO BASE STATION ID |
|---|---|
| 501 | 201 |
| 502 | 202 |
| ⋮ | ⋮ |

RADIO COMMUNICATION METHOD AND NETWORK DEVICE FOR DETECTING UNAUTHORIZED MOVEMENT OF A HOME RADIO BASE STATION

TECHNICAL FIELD

The present invention relates to a mobile communication method and a network device.

BACKGROUND ART

In a mobile communication system, a radio base station for public communications is generally configured to be operated and managed constantly by a network operator after start of its operation. This configuration allows the radio base station for public communications to respond to randomly transmitted connection requests from mobile stations.

For example, a network administrator starts operation of a radio base station for public communications in the following manner.

(1) Install a radio base station for public communications, connect lines and so forth, and then turn on the radio base station to thereby open a line between itself and an upper node (such as a radio control device).

(2) Set operation parameters to be used in the radio base station for public communications, via a network or by manual input.

After the operation is started with the settings of the parameters reflected therein, the radio base station for public communications continuously provides a communication service with the least disconnection except for a case where the radio base station needs to be restarted due to a failure, a change in the device configuration, or the like.

In a case of removing such a radio base station for public communications, the radio base station for public communications is caused to stop the provision of the communication service and is then turned off.

Note that basically the same operation as the radio base station for public communications is likely to be carried out for a radio base station installed to a small area such as a home, which is referred to as a "home radio base station (Home eNB)."

SUMMARY OF THE INVENTION

However, a home radio base station is assumed to be purchased and installed by a user himself/herself. Since the user carries out the procedures (1) and (2), it might become impossible to accurately manage information on a location where the home radio base station is installed (installation location).

Moreover, even if an installation location of the home radio base station is once correctly registered to a mobile communication network, the home radio base station may be relocated at the user's convenience. For this reason, there is need for a structure which detects moving of home radio base stations, so that only home radio base stations whose installation locations are registered normally are operated in a mobile communication network.

As such a structure, assumed is a method in which a mobile communication network acquires, as an installation location, location information acquired by a GPS function implemented on the home radio base station.

Although this structure allows the mobile communication network to always know the installation location of the home radio base station, the home radio base station needs to implement the GPS function, which would cause a problem of increased cost of the home radio base station.

In addition, since the GPS function requires reception of radio waves from multiple satellites, the GPS function may not work in the home radio base station which is often installed indoors.

Hence, the present invention has been made in view of the above problems, and has an objective to provide a mobile communication method and a network device which enable detection of unauthorized moving of a home radio base station of which a mobile telecommunications operator is not notified, without causing the home radio base station to implement a GPS function.

the first feature of the present invention is summarized in that a mobile communication method including step A of managing identification information on a radio base station and identification information on an information transfer device in association with each other in a radio base station manager by a network device; step B of transmitting, when the radio base station is moved, an installation signal from the radio base station to an information transfer device to which the radio base station is connected; step C of transferring the received installation signal from the information transfer device to which the radio base station is connected to the network device; and step D of detecting by the network device an unauthorized moving of the radio base station, in a case where the network device determines by referring to the radio base station information manager that the identification information on the radio base station included in the received installation signal and the identification information on the information transfer device to which the radio base station is connected are not managed in association with each other.

In the first feature of the present invention, in the step D, the network device may instruct the radio base station to notify the network device of an installation location of the radio base station, in a case where the network device determines by referring to the radio base station information manager that the identification information on the radio base station included in the received installation signal and the identification information on the information transfer device to which the radio base station is connected are not managed in association with each other.

The second feature of the present invention is summarized in that a network device including a radio base station manager configured to manage identification information on a radio base station and identification information on an information transfer device in association with each other, an installation signal receiver configured to receive an installation signal transmitted by a radio base station via an information transfer device to which the radio base station is connected, and a detector configured to detect an unauthorized moving of the radio base station, in a case where the detector determines by referring to the radio base station information manager that that the identification information on the radio base station included in the received installation signal and the identification information on the information transfer device to which the radio base station is connected are not managed in association with each other.

In the second feature of the present invention, the detector may instruct the radio base station to notify the network device of an installation location of the radio base station in a case where the detector determines by referring to the radio base station information manager that the identification information on the radio base station included in the received installation signal and the identification information on the information transfer device to which the radio base station is connected are not managed in association with each other.

As described above, according to the present invention, it is possible to provide a mobile communication method and a network device which enable detection of unauthorized moving of a home radio base station of which a mobile telecommunications operator is not notified, without causing the home radio base station to implement a GPS function.

MODES FOR CARRYING OUT THE INVENTION (Configuration of Mobile Communication System According to First Embodiment of Present Invention)

A description will be given of a configuration of a mobile communication system according to a first embodiment of the present invention with reference to FIG. 1 through FIG. 3.

Figure 1:
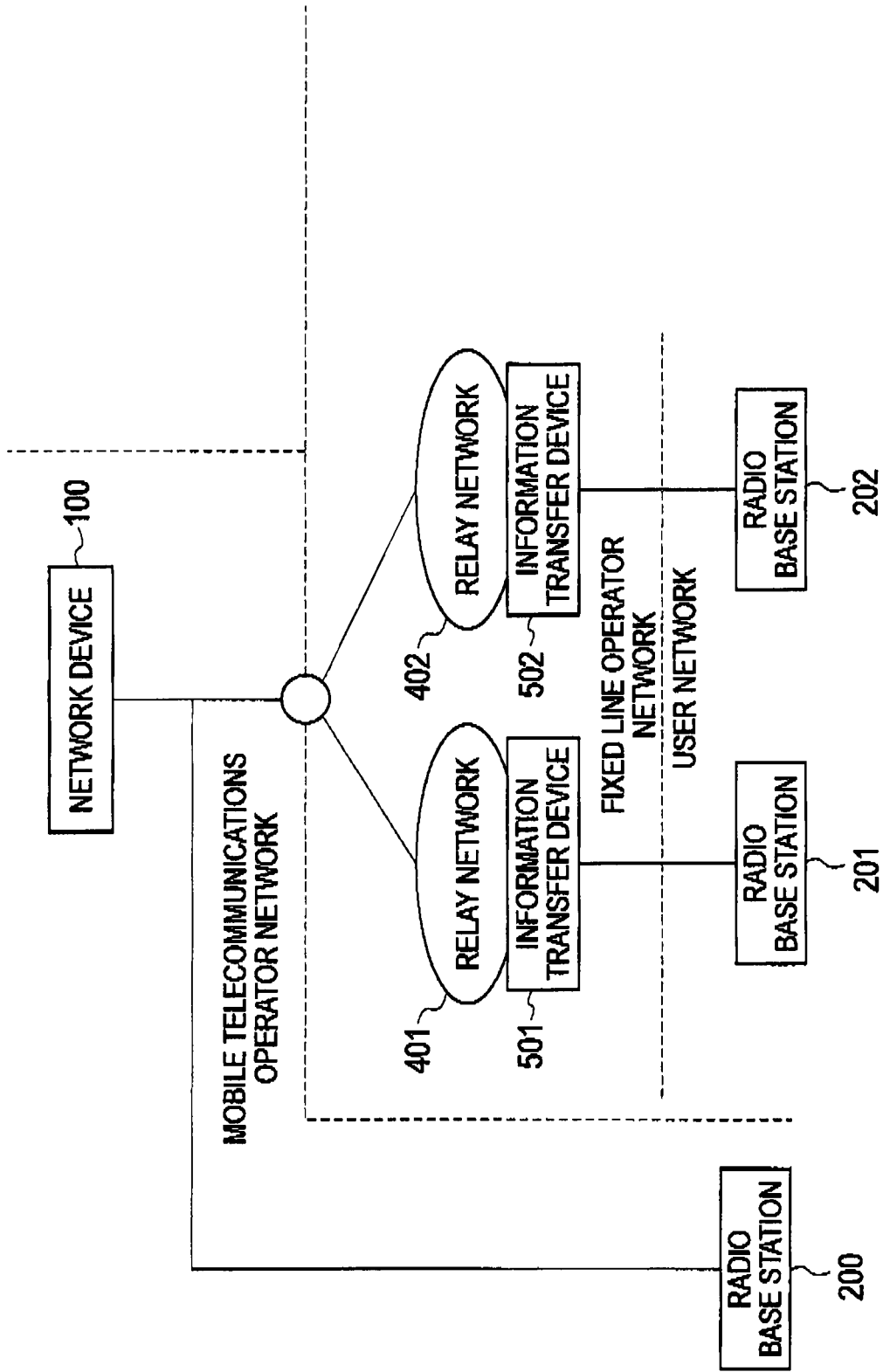
FIG. 1 is an overall configuration diagram of a mobile communication system according to a first embodiment of the present invention.

As shown in FIG. 1, the mobile communication system according to the embodiment includes a network device 100, information transfer devices 501, 502 connected to relay networks 401, 402, respectively, and radio base stations 200 to 202.

Note that the radio base station 200 is a radio base station for public communications installed in a mobile telecommunications operator network which is managed by a network operator (mobile telecommunications operator). Meanwhile, the radio base stations 201 and 202 are home radio base stations managed by a user subscribing to a communication service provided by the network administrator (mobile telecommunications operator), and may be moved by the user.

For example, the radio base stations 201 and 202 may be installed in a user network (LAN: local area network) managed by the user, and connect to the network device 100 in the mobile telecommunications operator network via an FTTH or ADSL-access operator network.

At the time of installation or moving, the radio base stations 201 and 202 are configured to transmit an installation signal to the respective information transfer devices 501 and 502 to which they are connected. The information transfer devices 501 and 502 are configured to transfer the received installation signal to the network device 100.

The information transfer devices 501 and 502 may be configured to receive from the network device 100 radio base station information including identification information on radio base stations which should be controlled under the information transfer devices 501 and 502, and to manage the received radio base station information by a radio base station information manager.

Here, the identification information on the radio base station may be a radio base station ID, or a user ID of an owner of the radio base station. In addition, the identification information on a radio base station may include information other than the identification information on the radio base station, such as information on a location where the radio base station is installed (installation location).

Note that the information transfer devices 501 and 502 may each be configured to transfer the installation signal to the network device 100, without referring to the radio base station information manager to determine whether or not the information transfer device 501 or 502 manages the radio base station information including the identification information on the radio base station, which is included in the received installation signal.

In addition, the information transfer devices 501 and 502 are configured to transfer data not only to the mobile telecommunications operator network but also to an ISP (Internet service provider) operator network, for example.

Figures 2, 3:
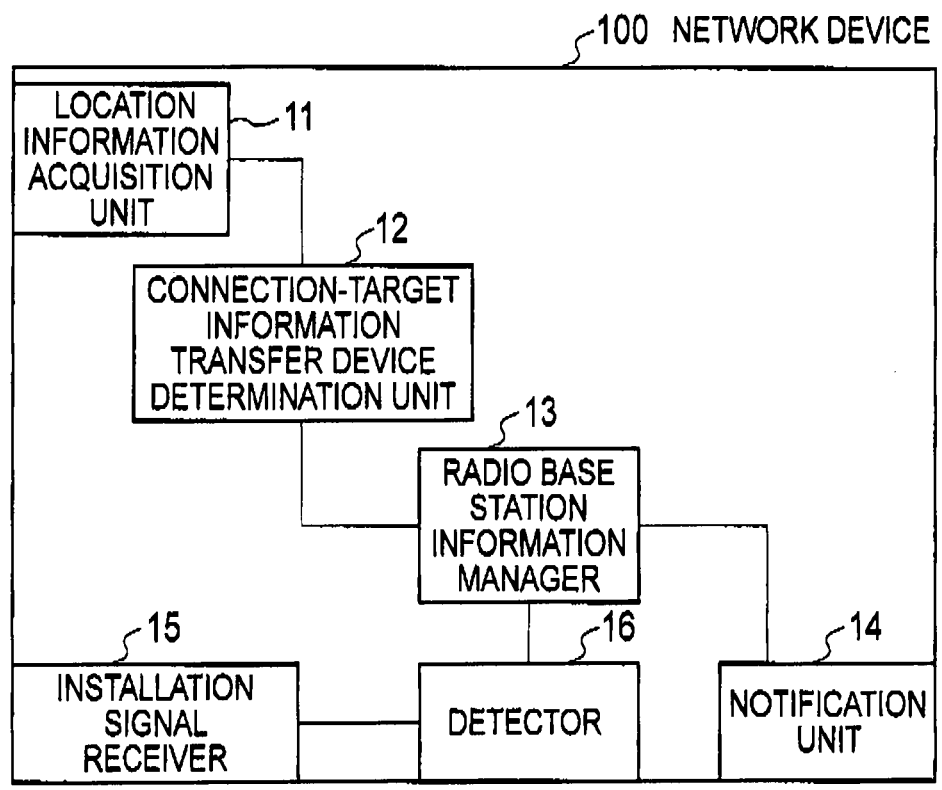
FIG. 2 is a functional block diagram of a network device according to the first embodiment of the present invention.
FIG. 3 is a diagram showing an example of radio base station information managed by the network device according to the first embodiment of the present invention.

As shown in FIG. 2, the network device 100 (such as a radio control device) includes a location information acquisition unit 11, a connection-target information transfer device determination unit 12, a radio base station information manager 13, a notification unit 14, an installation signal receiver 15 and a detector 16.

The location information acquisition unit 11 is configured to acquire an installation location (location information) of the radio base station 201 or 202, which is designated by a purchaser of the radio base station 201 or 202.

Here, the installation location (location information) of the radio base station 201 or 202 designated by the purchaser of the radio base station 201 or 202 may be inputted by a staff or the like at a distributor of the radio base station 201 or 202.

The connection-target information transfer device determination unit 12 is configured to determine, in accordance with an inputted installation location of a radio base station, an information transfer device in which the radio base station should be accommodated (connected).

For example, the information transfer device 501 or 502 is installed city by city, and the connection-target information transfer device determination unit 12 may determine that the radio base station 201 installed in city A should be accommodated in the information transfer device 501, and the radio base station 202 installed in city B should be accommodated in the information transfer device 502.

The radio base station information manager 13 is configured to store an "information transfer device ID" and a "radio base station ID" in association with each other as shown in FIG. 3.

Here, the "information transfer device ID" is identification information on an information transfer device in which a radio base station identified by the "radio base station ID" should be accommodated (connected), and the "radio base station ID" is identification information on a radio base station.

Specifically, the radio base station information manager 13 is configured to store identification information on the information transfer device determined by the connection-target information transfer device determination unit 12 in association with identification information on the radio base station.

In addition, the radio base station information manager 13 may manage not only the "information transfer device ID" and the "radio base station ID," but also operation parameters or the like of each radio base station.

Note that while the mobile telecommunications operator can set an installation location of the radio base station 200 at every installation of the radio base station 200, a user installs the radio base stations 201 and 202, and thus when changing the installation location of the radio base stations 201 and 202, the user is required to notify the mobile telecommunications operator of that fact.

The notification unit 14 is configured to notify an information transfer device corresponding to an inputted installation location of a radio base station, of identification information on the radio base station.

The installation signal receiver 15 is configured to receive an installation signal transmitted from the radio base station 201 or 202 via the information transfer device 501 or 502 to which the radio base station 201 or 202 is connected.

The detector 16 is configured to detect an unauthorized moving of the radio base station 201 or 202, in a case where it is determined by referring to the radio base station information manager 13 that the identification information on the radio base station 201 or 202 included in the received installation signal is not managed in association with the identification information on the information transfer device 501 or 502 to which the radio base station 201 or 202 is connected.

To be specific, in a case where it is determined by referring to the radio base station information manager 13 that the identification information on the radio base station 201 or 202 included in the received installation signal is not managed in association with the identification information on the information transfer device 501 or 502 to which the radio base station 201 or 202 is connected, the detector 16 may reject the unauthorized moving of the radio base station 201 or 202 and instruct the radio base station 201 or 202 to notify the network device 100 of the installation location of the radio base station 201 or 202.

On the other hand, the detector 16 is configured to determine that moving of the radio base station 201 or 202 is authorized (in other words, the mobile telecommunications operator is notified of the change in the installation location of the radio base station 201 or 202) and thus accept moving of the radio base station 201 or 202, in a case where it is determined by referring to the radio base station information manager 13 that the identification information on the radio base station 201 or 202 included in the received installation signal is managed in association with the identification information on the information transfer device 501 or 502 to which the radio base station 201 or 202 is connected.

(Operation of Mobile Communication System According to First Embodiment of Present Invention)

Figure 4:
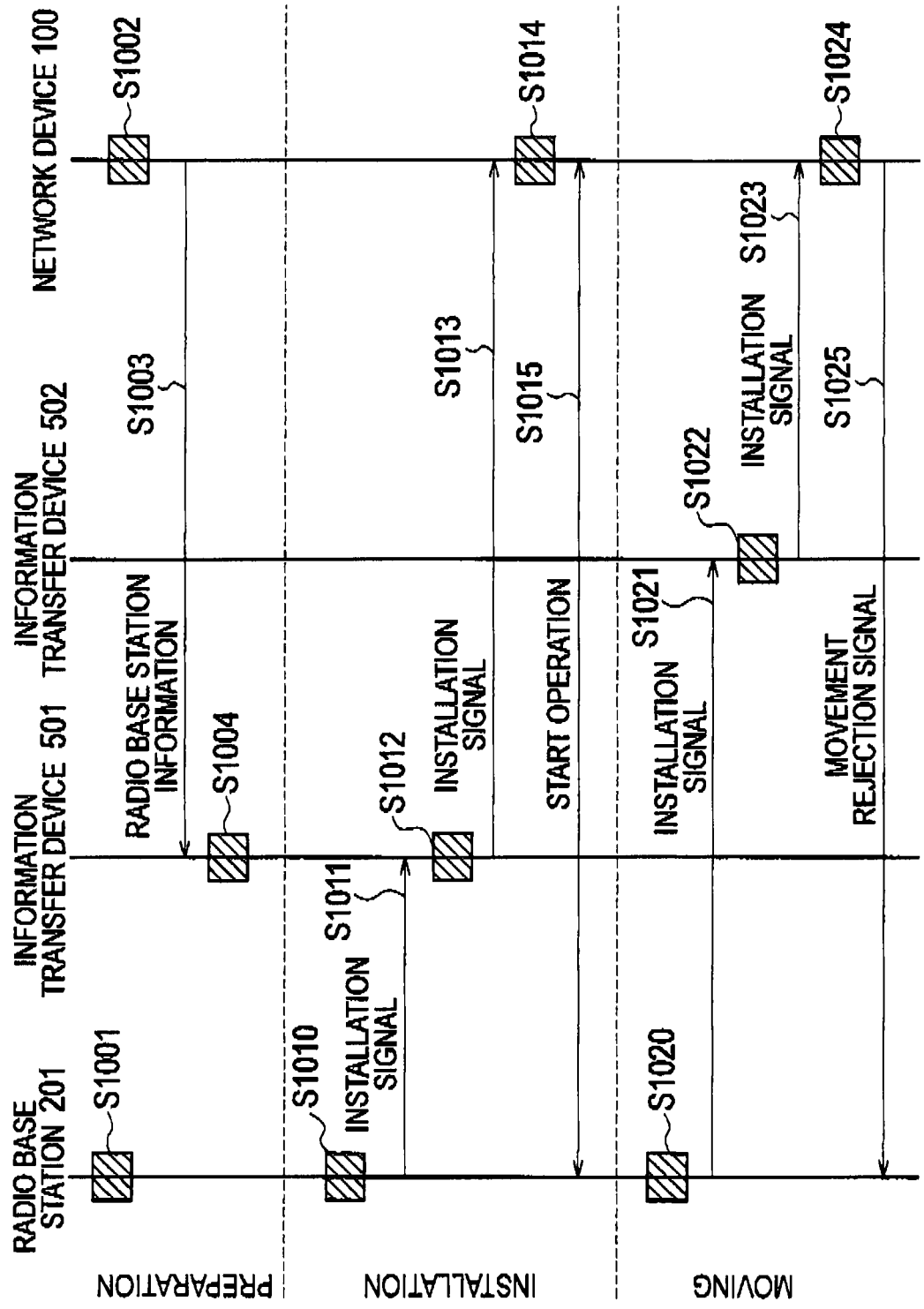
FIG. 4 is a sequence diagram showing an operation of the mobile communication system according to the first embodiment of the present invention.

Referring to FIG. 4, a description will be given of an operation of the mobile communication system according to the first embodiment of the present invention, that is, an operation carried out between installation and moving of the radio base station 201.

As shown in FIG. 4, in step S1001, a user purchases the radio base station 201 which is a home radio base station. Here, when the user subscribes to a service at a distributor or the like of the mobile telecommunications operator, an installation location of the radio base station 201, the relay network 401 that accommodates the radio base station 201 according to the installation location, identification information (such as a user ID) on the radio base station 201 and the like are set for the radio base station 201. At this time, the identification information on the radio base station 201 is assumed to be unique to the radio base station 201 in the entire relay network.

In step S1002, the user performs the same settings for the network device 100, the settings being related to the identification information on the radio base station 201, the installation location of the radio base station 201, and the like.

In step S1003, the network device 100 transmits, to the information transfer device 501 corresponding to the installation location of the set (inputted) radio base station 201, radio base station information including identification information on the radio base station 201.

In step S1004, the information transfer device 501 manages the received radio base station information including the identification information on the radio base station 201.

When the radio base station 201 is installed in step S1010, the radio base station 201 in step S1011 transmits an installation signal including identification information on the radio base station 201, to the information transfer device 501 to which the radio base station 201 is connected.

The information transfer device 501 receives the above-mentioned installation signal including the identification information on the radio base station 201 in step S1012, and then transfers the installation signal to the network device 100 in step S1013.

Here, the information transfer device 501 may refer to the radio base station information manager 13 to determine whether or not the identification information on the radio base station 201 included in the received installation signal is managed.

In step S1014, upon receipt of the installation signal transferred by the information transfer device 501 via the relay network 401, the network device 100 refers to the radio base station information manager 13 to determine whether or not the identification information on the radio base station 201 included in the received installation signal is managed in association with the identification information on the information transfer device 501 to which the radio base station 201 is connected.

On determining that the radio base station information manager 13 manages the identification information on the radio base station 201 included in the received installation signal in association with the identification information on the information transfer device 501 to which the radio base station 201 is connected, in step S1015, the network device 100 determines that the moving of the radio base station 201 is authorized (that is, the mobile telecommunications operator is notified of the change in the installation location of the radio base station 201, or the radio base station 201 is installed in a registered installation location), accepts the moving, and starts operation of the radio base station 201 accommodated in the network device 100.

Thereafter, if the user moves the radio base station 201 to a coverage area of the relay network 402 in step S1020, the radio base station 201 in step S1021 transmits an installation signal including identification information on the radio base station 201 to the information transfer device 502 to which the radio base station 201 is connected.

The information transfer device 502 receives the above-mentioned installation signal including the identification information of the radio base station 201 in step S1022, and transfers the installation signal to the network device 100 in step S1023.

Here, the identification information on the radio base station 501 is managed only by the information transfer device 201 and not by the information transfer device 502. In step S1023, the information transfer device 202 transfers the received installation signal to the network device 100.

In step S1024, upon receipt of the installation signal transferred by the information transfer device 502 via the relay network 402, the network device 100 refers to the radio base station information manager 23 to determine whether or not the identification information on the radio base station 201 included in the received installation signal is managed in association with the identification information on the information transfer device 502 to which the radio base station 201 is connected.

On determining that the radio base station information manager 13 does not manage the identification information on the radio base station 201 included in the received installation signal in association with the identification information on the information transfer device 502 to which the radio base station 201 is connected, the network device 100 detects an unauthorized moving of the radio base station 201 (that is, the mobile telecommunications operator is not notified of the change in the installation location of the radio base station 201, or the radio base station 201 is not installed in a registered installation location), rejects the moving, and in step S1025 transmits a movement rejection signal to the radio base station 201.

Here, the network device 100 may instruct, by use of the movement rejection signal, the radio base station 201 to notify the network device 100 of the installation location of the radio base station 201.

As a result, the radio base station 201 is unable to start operation under control of the information transfer device 502 at the location to which the radio base station is moved.

To move the radio base station 201, the user is required to notify the mobile telecommunications operator of the installation location (location information) to which the radio base station 201 is moved, to thereby update the content of the radio base station information manager 13 of the network device 100.

(Advantageous Effects of Mobile Communication System according to First Embodiment of Present Invention)

The mobile communication system according to the first embodiment of the present invention enables detection of unauthorized moving of the radio base station 201 which the mobile telecommunications operator is not notified of, without causing a home radio base station to implement a GPS function. This is made possible by configuring the network device 100 so as to detect the unauthorized moving of the radio base station 201 which the mobile telecommunications operator is not notified of and to not allow the moving, the detection being made when the network device 100 receives an installation signal from the radio base station 201 whose installation location is not registered normally.

(Modified Example)

A mobile communication system according to this embodiment may be a W-CDMA mobile communication system, or may be an LTE (long term evolution) mobile communication system.

For example, in a case where the mobile communication system according to this embodiment is a W-CDMA mobile communication system, at least some of functions of the network device 100 shown in FIG. 2 may be provided in a radio network controller RNC or an exchange station MSC/SGSN.

In a case where the mobile communication system according to this embodiment is a W-CDMA mobile communication system in which a concentrator HNB-GW accommodating the radio base stations 201, 202 is provided, at least some of functions of the network device 100 shown in FIG. 2 may be provided in the concentrator HNB-GW.

Meanwhile, in a case where the mobile communication system according to this embodiment is an LTE mobile communication system, at least some of functions of the network device 100 shown in FIG. 2 may be provided in an exchange MME.

Note that in a case where the mobile communication system according to this embodiment is an LTE mobile communication system in which an concentrator HNB-GW accommodating the radio base stations 201, 202 is provided, at least some of functions of the network device 100 shown in FIG. 2 may be provided in the concentrator HNB-GW.

Incidentally, the operation of the above-mentioned radio base stations 200, 20 and the network device 100 may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the radio base stations 200, 201 and the network device 100. Alternatively, the storage medium and the processor may be provided in the radio base stations 200, 201 and the network device 100 as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   step A of managing identification information on a radio base station and identification information on an information transfer device in association with each other in a radio base station manager by a network device;
   step B of transmitting, when the radio base station is moved, an installation signal from the radio base station to an information transfer device to which the radio base station is connected;
   step C of transferring the received installation signal from the information transfer device to which the radio base station is connected to the network device; and
   step D of detecting by the network device an unauthorized moving of the radio base station, in a case where the network device determines by referring to the radio base station information manager that the identification information on the radio base station included in the received installation signal and the identification information on the information transfer device to which the radio base station is connected are not managed in association with each other.

2. The mobile communication system according to claim 1, wherein in the step D, the network device instructs the radio base station to notify the network device of an installation location of the radio base station, in a case where the network device determines by referring to the radio base station information manager that the identification information on the radio base station included in the received installation signal and the identification information on the information transfer device to which the radio base station is connected are not managed in association with each other.

3. A network device comprising:
   a radio base station manager configured to manage identification information on a radio base station and identification information on an information transfer device in association with each other;

an installation signal receiver configured to receive an installation signal transmitted by a radio base station via an information transfer device to which the radio base station is connected; and a detector configured to detect an unauthorized moving of the radio base station, in a case where the detector determines by referring to the radio base station information manager that that the identification information on the radio base station included in the received installation signal and the identification information on the information transfer device to which the radio base station is connected are not managed in association with each other.

4. The network device according to claim 3, wherein the detector instructs the radio base station to notify the network device of an installation location of the radio base station in a case where the detector determines by referring to the radio base station information manager that the identification information on the radio base station included in the received installation signal and the identification information on the information transfer device to which the radio base station is connected are not managed in association with each other.

* * * * *